United States Patent
Piasecki et al.

(10) Patent No.: US 12,035,664 B2
(45) Date of Patent: Jul. 16, 2024

(54) RED LIGHT CONVERTER FOR CONVERSION OF INACTIVE PHYTOCHROME

(71) Applicants: Jon Piasecki, Housatonic, MA (US); Gary Lee Rawson, Portland, OR (US)

(72) Inventors: Jon Piasecki, Housatonic, MA (US); Gary Lee Rawson, Portland, OR (US)

( * ) Notice: Subject to any disclaimer, the term of this patent is extended or adjusted under 35 U.S.C. 154(b) by 0 days.

(21) Appl. No.: 18/106,909

(22) Filed: Feb. 7, 2023

(65) Prior Publication Data

US 2023/0225257 A1  Jul. 20, 2023

Related U.S. Application Data

(63) Continuation-in-part of application No. 16/838,698, filed on Apr. 2, 2020, now Pat. No. 11,576,247.

(51) Int. Cl.
| | | |
|---|---|---|
| *A01G 7/00* | (2006.01) | |
| *A01G 7/04* | (2006.01) | |
| *A01G 9/24* | (2006.01) | |
| *A01G 9/26* | (2006.01) | |
| *F21V 23/04* | (2006.01) | |
| *H05B 45/20* | (2020.01) | |
| *H05B 47/16* | (2020.01) | |
| *F21Y 115/10* | (2016.01) | |

(52) U.S. Cl.
CPC ............ *A01G 7/045* (2013.01); *A01G 9/249* (2019.05); *A01G 9/26* (2013.01); *F21V 23/0464* (2013.01); *H05B 45/20* (2020.01); *H05B 47/16* (2020.01); *F21Y 2115/10* (2016.08)

(58) Field of Classification Search
CPC .......... F21Y 2115/10; F21W 2131/109; H05B 47/16; H05B 45/20; A01G 7/045; A01G 9/249; A01G 9/26; F21V 23/0464
See application file for complete search history.

(56) References Cited

U.S. PATENT DOCUMENTS

2022/0400622 A1* 12/2022 McCord ................ A01G 7/045

* cited by examiner

*Primary Examiner* — Gerald J Sufleta, II
(74) *Attorney, Agent, or Firm* — Addy Hart P.C.

(57) ABSTRACT

Activation of a far-red light device with a far-red light frequency that includes moonlight light that promotes the conversion of inactive Pfr to active Pr in short-day plants prior to a dark period.

20 Claims, 4 Drawing Sheets

RED LIGHT CONVERTER FOR CONVERSION OF INACTIVE PHYTOCHROME

RELATED APPLICATIONS

This Application is a Continuation-in-Part of and claims priority to U.S. patent application Ser. No. 16/838,698, titled RED LIGHT CONVERTER FOR CONVERSION OF INACTIVE PHYTOCHROME, filed on Apr. 2, 2020, issued on Feb. 7, 2023 with application Ser. No. 16/838,698, that is also incorporated by reference herein.

TECHNICAL FIELD

The present invention generally relates to a device for speeding the flowering cycle of a short-day plant and, more particularly, to using light to convert inactive phytochrome (Pfr) to active (Pr).

BACKGROUND

When does a plant know when to flower or bloom? Some plants flower or bloom at any time. These are known as day-neutral plants. Some plants flower early in the season, and these are long-day plants, and some flower late in the growing season, and these are short-day plants. Short-day plants flower as the length of daylight shortens and the length of night or darkness increases typically towards the end of the outdoor growing cycle for where the plant is located. Some horticulturally important short-day plants include African Marigolds, Cosmos, Zinnias, Hemp (*Cannabis Sativa*), and *Celosia*.

Short-day plants have a chemical mechanism to respond to the changing photoperiod. This mechanism is the phytochrome system, in which an inactive form of phytochrome pigment (Pfr) is converted to an active form phytochrome pigment (Pr). In short-day plants, this conversion reaching a threshold level triggers the formation of flowers after exposure to increasing hours of darkness. Typically in Hemp plants, exposure to twelve hours of darkness allows for an adequate conversion of Pfr to Pr to trigger the formation of flowering.

In conventional greenhouse agriculture for *Cannabis*/Hemp, manipulating the phytochrome system to induce flowering is triggered by light deprivation systems that remove the illumination from the *cannabis* plants by either shutting off the lighting or deploying a black-out screen over the entire grow operation. The *cannabis* plants respond to the 12 hours of darkness by producing flowers. An approach is needed to increase the inactive Pfr to active Pr and promote flowing in a short-day plant without using known light deprivation approaches while reducing the time required to promote the flowering.

SUMMARY

Promoting the flowering of short-day plants by exposing the short-day plants to electromagnetic energy in the far-red light wavelengths eliminates the need for light deprivation required in conventional approaches. Pfr is induced to convert to Pr rapidly by briefly exposing the short-day plants to a flash of red light in the wavelengths between 730 and 780 nm. The far-red light exposure is timed to occur at sunset outdoors or prior to the switching off of the light in an indoor growing facility.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A plant lighting device and approach are presented that accelerates the flowering of short-day plants by increasing the conversion rate of inactive phytochrome pigment (Pfr) 104 to active phytochrome pigment (Pr) 102 beyond the naturally occurring sunlight and darkness cycle.

Figure 1:
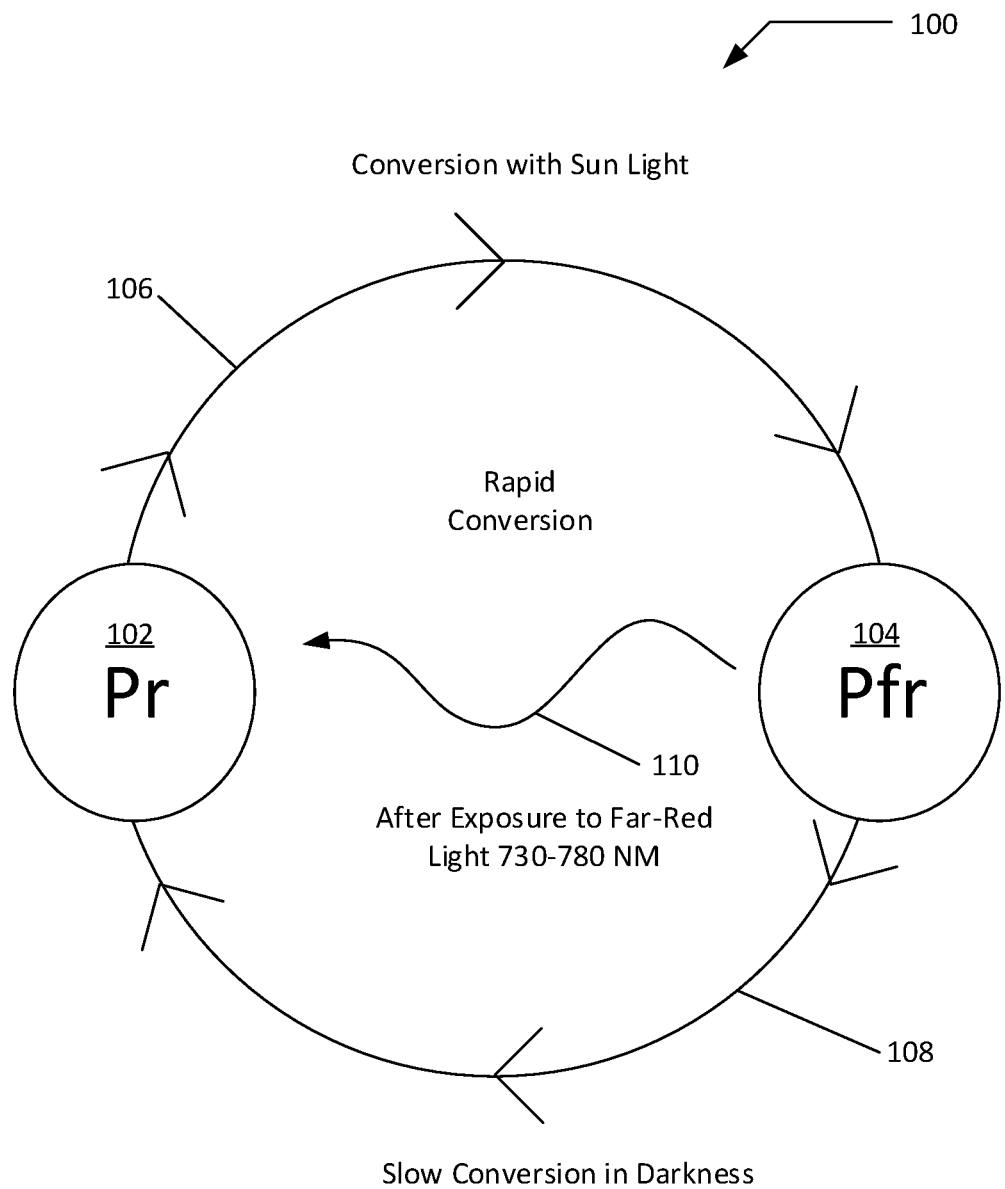
FIG. 1 is a diagram of the conversion of inactive Pfr to active Pr in accordance with an example implementation of the invention.

FIG. 1 is a diagram 100 of the conversion of inactive Pfr 104 to active Pr 102 in accordance with an example implementation of the invention. The conversion rate (with sunlight 106 and in darkness 108) of the inactive Pfr 104 to the active Pr 102 may be increased by exposure of the plants to far-red light in the wavelengths between 730 and 780 nm 110. It so happens that the inactive Pfr 104 can be induced to convert to the active Pr 102 more rapidly when the plants are exposed to a flash of far-red light in the wavelength range 730 and 780 nm 110. This far-red light exposure timed prior to darkness (at sunset outdoors or just prior to the switching off of the light in an indoor growing environment) accelerates the phytochrome system of short-day plants (i.e., African Marigolds, Cosmos, Zinnias, Hemp, and *Celosia*). This acceleration is such that the short-day plant responds as if it experienced two additional hours of darkness and consequently flowers more rapidly than it would with only ambient sunlight and darkness cycle.

In an outdoor cultivation scenario when the ambient solar day length is 14 hours, brief exposure of the short-day plants to far-red light 110 at sunset causes the plants to respond as if they experience two additional hours of darkness or the 12 hours of darkness needed to cross the active Pr 102 conversion threshold and to trigger the formation of flowers in the short-day plants. The exposure to far-red light must continue each evening until the ambient day length reaches 12 hours in length. This approach to growing and flower short-day plants has been successfully used at a latitude of 42.5 degrees north.

The impact of this approach enables short-day plants that are adapted to a more southerly climate to flower/ripen to maturity in my northern location. The impact of the approach on indoor cultivation is also profound. Instead of requiring 12 hours of darkness to trigger flowering, with the application of this far-red light at the end of the light cycle a cultivator could induce flowering with 14 hours of lighting. This additional lighting will create an additional 16.5% of light exposure and thus increase flower biomass because of the additional active photosynthetic time, whilst still allowing for the threshold level of the active Pr 102 to trigger flowering.

In nature, flowering in short-day plants begins when darkness reaches 12 hours in duration. Indoor growers mimic this by turning off all lights for 12 hours. Our novel process will increase the yield of short-day plants like *Cannabis*/Hemp, by triggering the flowering cycle while incident light is between 14 and 15 hours (or as darkness of 9-10 hours.) This process can be utilized both indoors and outdoors. This process utilizes a combination of light waves typically found during the natural triggering process when 12 hours of darkness is present. These light waves include the far-red spectrum and the moonlight spectrum, all simultaneously flashed for a short duration of less than one minute (may optimally be only for a few seconds). The flash can be applied outdoors at sunset or just after dark and indoors just after the lights are turned off or just before turning the lights off. Additionally, this process can be used outdoors to stage harvesting by staggering the exposure to different areas of the cultivation field.

Composition of the triggering light in a preferred implementation:
Wavelength: 730 nanometers, proportion of total light: 90%
Wavelength: 750 nanometers, proportion of light: 4%
Wavelength: 775 nanometers, proportion of light: 2%
Wavelength: 820 nanometers, proportion of light: 2%
Wavelength: 950 nanometers, proportion of light: 2%

This combination of light wavelengths more effectively triggers flower production outdoors and indoors. and allows the cultivator to apply additional light to the short-day plant in excess of the typical 12 hours of light commonly used in indoor cultivation. In short-day plants the flowering process is triggered by a bioactive compound called Phytochrome which is converted between its active and inactive form based on the number of hours of darkness the plant experiences and the entire process can be manipulated by the application of our process/invention which deploys far red wavelength light and the synergistic spectra reflected in full moonlight. Because the biomass of short-day flowers increases in direct proportion to incident light, our process allows for an increase in indoor production by up to 16% in the same physical space as untreated short-day plants. This same process allows the cultivator to trigger flowering earlier than afforded by natural sunlight in excess of 14 hours, and our invention/process allows the outdoor cultivator the option to stage flowering in short-day plants depending on when our invention is applied to particular rows of plants. The far-red light trigger is synergistically aided by the added spectra applied in the percentage they are found in full moonlight. Full moonlight composition with far-red light wavelength of 730 nanometers, the proportion of total light: 90% with the remaining 10% moonlight light is:
Wavelength: 750 nanometers, proportion of light: 4%
Wavelength: 775 nanometers, proportion of light: 2%
Wavelength: 820 nanometers, proportion of light: 2%
Wavelength: 950 nanometers, proportion of light: 2%

From prehistory to the modern era, farmers all over the world have planted, harvested, and performed innumerable religious and agrarian rites timed and directly linked to the phases of the moon. While best known in animals, the Circadian rhythm of plants is no less significant. The night/day cycle impacts multiple biological systems in the plant kingdom. The role of the night and particularly of the light of the moon in flowering is of great consequence to our invention/process. By adding the spectra of reflected full moonlight in their naturally occurring proportions, to 730 nm far-red light, an enhancement of the short-day plant's phytochrome flowering clock is activated, and the flowering cycle is artificially engaged according to the intention of the cultivator.

Our process/invention takes advantage of the infrared spectra predominating in the light reflected off the moon. The proportions of the spectra in our process/invention directly and specifically mimic the proportions of the spectra as measured in the incident full moonlight and are related to the reflectivity of our atmosphere and the slight gaseous Sodium and Potassium atmosphere of the lunar body.

The application of this approach may be deployed in a portable manner through existing drone technology to apply a flash of the light wavelengths specified above (From prehistory to the modern era farmers all over the world have planted, harvested, and performed innumerable religious and agrarian rites timed and directly linked to the phases of the moon. While best known in animals, the Circadian rhythm of plants is no less significant. The night/day cycle impacts multiple biological systems in the plant kingdom. The role of the night and particularly of the light of the moon in flowering is of great consequence to our invention/process. By adding the spectra of reflected full moonlight in their naturally occurring proportions, to 730 nm far-red light, an enhancement of the short-day plant's phytochrome flowering clock is activated, and the flowering cycle is artificially engaged according to the intention of the cultivator.

The triggering light approach takes advantage of the infrared spectra that predominate in the light reflected off the moon. The proportions of the spectra in our process/invention directly and specifically mimic the proportions of the spectra as measured in incident full moonlight and are related to the reflectivity of our atmosphere and the slight gaseous Sodium and Potassium atmosphere of the lunar body.

The application of the triggering light can be deployed in a portable manner through existing drone technology to apply a flash of the light wavelengths specified above for one minute or less. The utility of triggering light can be deployed on short-day plants in the following ways.

Indoors, applying triggering light can induce the flowering of short-day plants with a lighting regime longer than the typical 12/12 light cycle. The triggering light is applied after all grow lights are shut off, in a brief flash of less than one minute. This will allow the application of 14-15 hours of grow lights, depending on the strain or cultivar. The increased illumination afforded by applying the triggering light will allow increased biomass production in the flowering stage in direct proportion to the additional 2-3 hours of incident growth lighting. Initial data suggest up to a 16% increase in flower biomass in plants treated with a flash of triggering light shortly after the onset of the dark cycle of an indoor grow room, or when the light depravation system is applied to greenhouse or hoop house.

Outdoors, applying triggering light can induce flowering in short-day plants, after June 21 in the northern hemisphere and after December 21 in the southern hemisphere, when the ambient sunlight reaches 15 hours. The timing of this condition varies by latitude but is easily accessible in locational day-length tables. At latitude 42.27 N, the date the triggering light becomes effective is July 15. After that date, applying the triggering light to the short-day plants after sunset for a brief flash (less than one minute) every night until August 15 when the ambient day length reaches 13 hours affords an extra month of flowering time. This is particularly significant for short-day plants of a subtropical nature that might not finish in more northerly latitudes. In essence, the triggering light results in flowering that adds up to months of time for flower development in any short-day plant.

The triggering light has a significant impact on the staging of the flowering cycle in the outdoor cultivation of short-day plants. For example, if an outdoor cultivator desired to efficiently stage short-day plant harvest over a period of time, rather than harvesting an entire crop all at once, our invention/process could be applied in a sequence to a portion of the outdoor field where a short-day crop is grown. For example, at latitude 42.27 N, in one third of the production space (called section A), triggering light is applied after sunset for less than one minute nightly beginning on July 15. This illumination cycle would continue until August 15. On August 1, our flower triggering light would be applied to the next third of the production space (called section B) in the same manner until August 15. The final third, (section C) is not illuminated by triggering light. Assuming the entire field is composed of the same strain or cultivar with a 9-week flowering period until full maturity, Section A will be ready to harvest on September 21, Section B will be ready for harvest on October 3, and Section C will be ready for harvest on October 17. This allows the cultivator to stage their outdoor harvest and more efficiently deploy labor to bring down and process the plants, as opposed to the harvest conditions where our invention/process is not applied where the entire crop reaches maturity at the same time, potentially overwhelming cultivation labor at the end of the growth cycle with detrimental fungal conditions increasing as the weather cools.

Conversely, if the staging of harvest labor is not an issue, the cultivator can deploy triggering light for one minute or less on the entire field and harvest the entire crop before the onset of any number of types of negative ambient conditions that can occur later in the growth cycle depending on one's location. One example is the onset of cooler and wetter weather in the late season which has a detrimental fungal impact on short-day flowers.

The utility of the disclosed approach may be deployed on short-day plants in the following ways:

1. Indoors, the triggering light can induce the flowering of short-day plants with a lighting regime longer than the typical 12/12 light cycle. The triggering light is applied after all grow lights are shut off, in a brief flash of less than one minute. This allows the application of 14-15 hours of grow lights, depending on the strain or cultivar. The increased illumination afforded by applying the triggering light will allow increased biomass production in the flowering stage in direct proportion to the additional 2-3 hours of incident growth lighting. Initial data suggest up to a 16% increase in flower biomass in plants treated with a flash of our invention/process shortly after the onset of the dark cycle of an indoor grow room, or when the light deprivation system is applied to a greenhouse or hoop house.

2. Outdoors, the triggering light approach induces flowering in short-day plants, after June 21 in the northern hemisphere and after December 21 in the southern hemisphere, when the ambient sunlight reaches 15 hours. The timing of this condition varies by latitude but is easily accessible in locational day-length tables. At latitude 42.27 N, the date the invention/process becomes effective is July 15. After that date, applying our triggering light approach to the short-day plants after sunset for a brief flash (less than one minute every night until August 15) of the triggering light when the ambient day length reaches 13 hours affords an extra month of flowering time. This is particularly significant for short-day plants of a subtropical nature that might not finish in more northerly latitudes. In essence, our invention triggers flowering and adds up to a month of time for flower development in any short-day plant.

3. The approach has a significant impact on the staging of the flowering cycle in the outdoor cultivation of short-day plants. For example, if an outdoor cultivator desired to efficiently stage short-day plant harvest over a period of time, rather than harvesting an entire crop all at once, our approach may be applied in a sequence to a portion of the outdoor field where a short-day crop is grown. For example, at latitude 42.27 N, in one-third of the production space (called section A), our flower triggering approach is applied after sunset for less than one minute nightly beginning on July 15. This triggering light illumination cycle would continue until August 15. On August 1, the approach may be applied to the next third of the production space (called section B) in the same manner until August 15. The final third, (section C) is not illuminated by the triggering light. Assuming the entire field is composed of the same strain or cultivar that has a 9-week flowering period until full maturity, Section A will be ready to harvest on September 21, Section B will be ready for harvest on October 3, and Section C will be ready for harvest on October 17. This allows the cultivator to stage their outdoor harvest and more efficiently deploy labor to bring down and process the plants, as opposed to the harvest conditions where the approach is not applied and where the entire crop reaches maturity at the same time, potentially overwhelming cultivation labor at the end of the growth cycle with detrimental fungal conditions increasing as the weather cools.

Conversely, if the staging of harvest labor is not an issue, the cultivator can deploy triggering light on the entire field and harvest the entire crop before the onset of any types of negative ambient conditions that can occur later in the growth cycle depending on one's location. One example is the onset of cooler and wetter weather in the late season which has a detrimental fungal impact on short-day flowers.

The light trigger device may be handheld, pole-mounted, drone-carried, drone-incorporated, robot-mounted, wire-mounted, wire suspended, and/or track-mounted. The size of the trigger light and the number of trigger lights required may be dependent upon the field location (inside/outside), field size, and availability of power.

Figure 2:
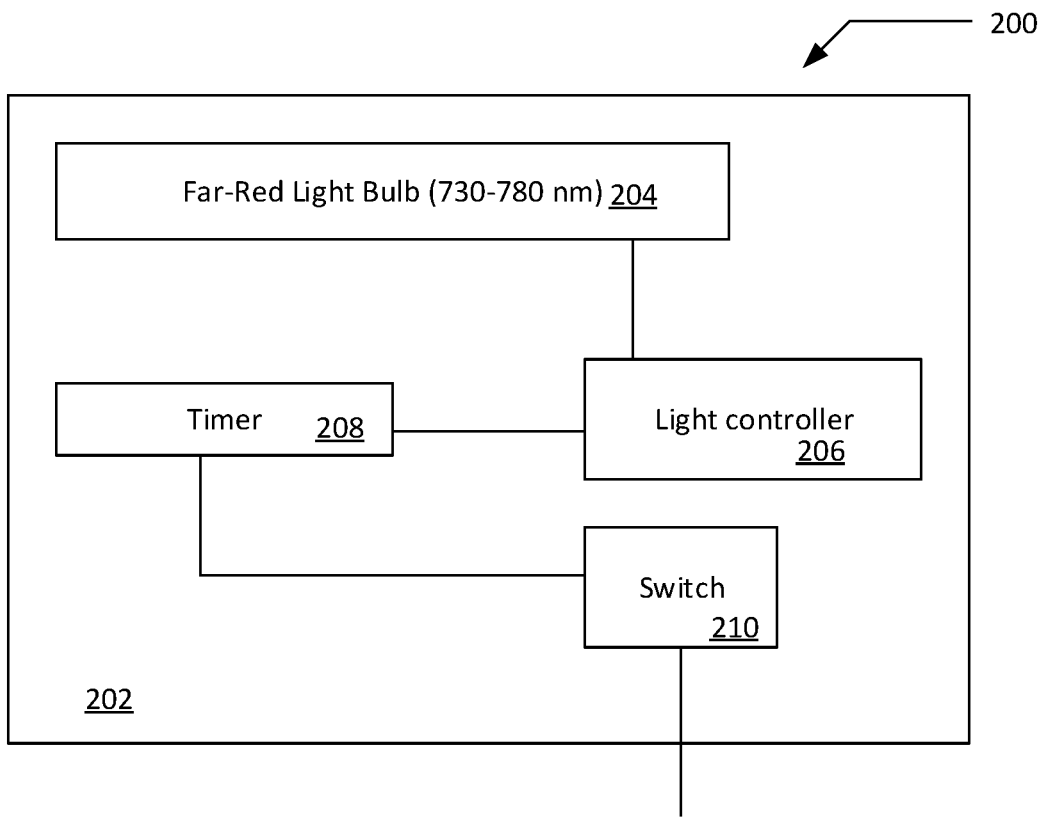
FIG. 2 is a block diagram of a Red-Light Device (RLD) that accelerates the conversion of inactive Pfr to active Pr as depicted in FIG. 1 in accordance with an example implementation of the invention.

Turning to FIG. 2, a block diagram 200 of a Red-Light Device (RLD) 202 that accelerates the conversion of inactive Pfr 104 to active Pr 102 as depicted in FIG. 1 is presented in accordance with an example implementation of the invention. The RLD 200 has a far-red light bulb with a frequency between 730-780 nm 204 coupled to a light controller 206 that powers the light bulb 204, such as a fluorescent light ballast or circuitry for powering a Light Emitting Diode (LED) light. FIG. 2 depicts a single light bulb, but in practice, a plurality of far-red light bulbs may be combined and/or a plurality of RLDs may be combined. A timer 208 is coupled to a switch 210 that powers the RLD 202. The power may be direct current (DC) or alternating current (AC) depending upon the implementation. The switch 210 energizes the device 202. The timer 208 may be a mechanical timer, electric timer, digital timer, or a combination of electro-mechanical timer. In the current implementation, a digital timer is employed as timer 208 and starts operating in response to the switch 210. In other implementations, the timer 208 may control a plurality of RLDs. The timer 208 is set to activate the far-red light bulb 204 via light controller 206 at the end of a light cycle (sunset or prior to traditional lights being turned off) for ten minutes in the current implementations, but in other implementations the time may be between five and fifteen minutes. The brief exposure at the end of the light cycle to the light from the far-red light bulb 204 triggers early flowering and so allows for the successful growth of short-day plants in more northerly areas by boosting biomass and the concurrent trichome production. Similarly, in indoor cultivation operations, the early flowering of short-day plants increases productivity and profit while reducing the expense required in light deprivation technologies.

Figure 3:
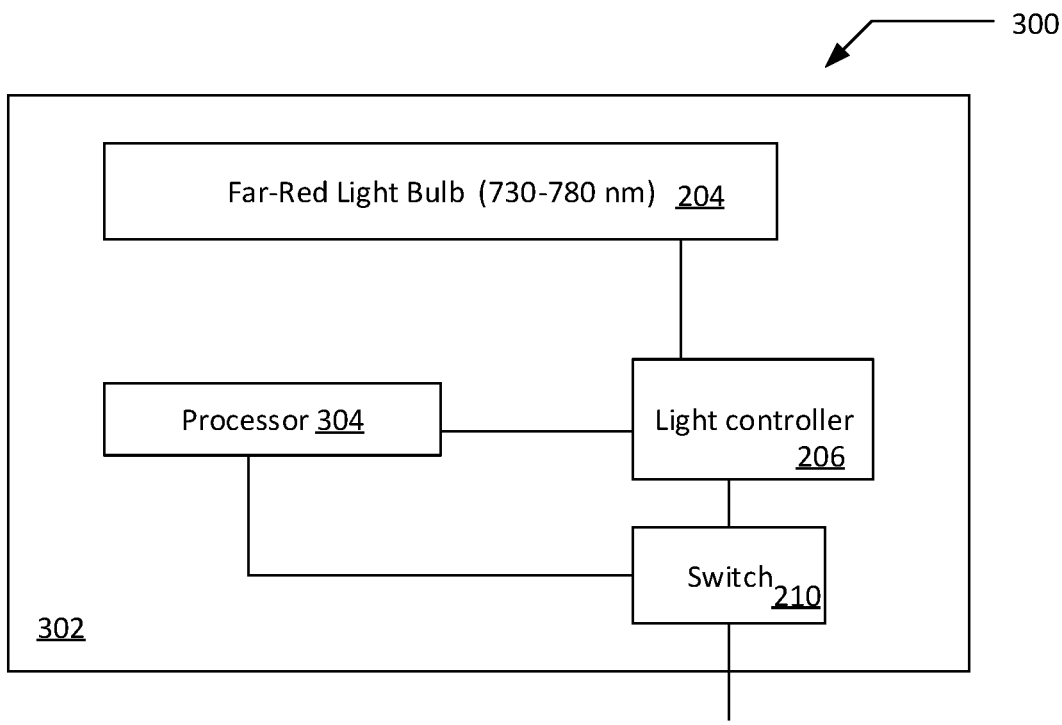
FIG. 3 is a block diagram of the RLD that accelerates the conversion of inactive Pfr to active Pr as depicted in FIG. 1, controlled by a processor in accordance with an example implementation of the invention.

In FIG. 3, a block diagram 300 of the RLD 302 that accelerates the conversion of inactive Pfr 104 to active Pr 102 as depicted in FIG. 1 controlled by a processor 302 in accordance with an example implementation of the invention. The RLD 302 has a far-red light bulb with a frequency between 730-780 nm 204 coupled to a light controller 206 that powers the light bulb 204. A processor 302 is coupled to a switch 210 that powers the RLD 302. The switch 210 energizes the device 302. The processor 304 may be a microcontroller, microprocessor, digital circuits functioning as a controller, analog circuits functioning as a controller. The processor 304 is configured to communicate with or implements a timer (depending upon the implementation) that turns on the far-red light bulb 204 as sunset or prior to traditional lights being turned off). The processor 304 may be preprogrammed with sunset times (sunset data set) for at least part of the year for its location, or for a time period prior to traditional lights being turned off. In yet another implementation, an input from the traditional lighting system may be coupled or controlled by the processor and the far-red light bulb being energized for a predetermined period before all the lights traditional and far-red light are turned off.

Figure 4:
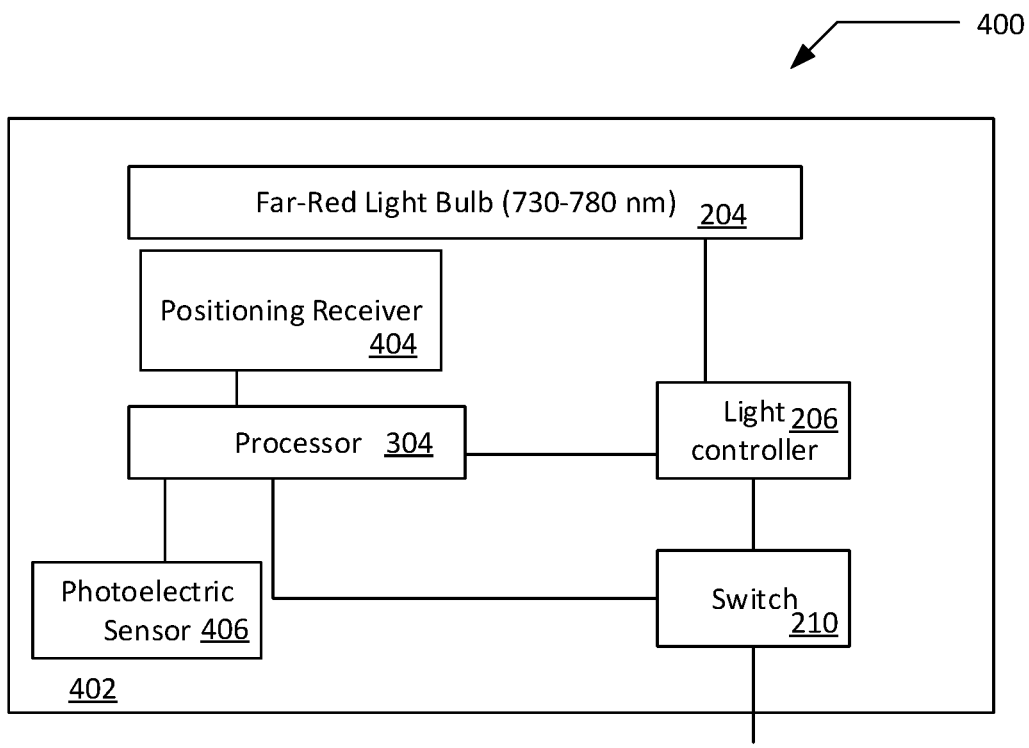
FIG. 4 is a block diagram of the RLD that accelerates the conversion of inactive Pfr to active Pr as depicted in FIG. 1, employing a positioning receiver in accordance with an example implementation of the invention.

Turning to FIG. 4, a block diagram 400 of the RLD 402 that accelerates the conversion of inactive Pfr 104 to active Pr 102 as depicted in FIG. 1 employing a positioning receiver 404 is illustrated in accordance with an example implementation of the invention. The RLD 402 has a far-red light bulb with a frequency between 730-780 nm 204 coupled to a light controller 206 that powers the light bulb 204. A processor 302 is coupled to a switch 210 that powers the RLD 302. The switch 210 energizes the device 402. The processor 304 may be a microcontroller, microprocessor, digital circuits functioning as a controller, analog circuits functioning as a controller. The processor 304 is coupled to a positioning receiver 404 and photoelectric sensor, such as a light sensor 406, in the current implementation. An example of a positioning receiver 404 is a global positing satellite receiver (GPS) that is able to determine its location using a network of orbiting satellites. An additional advantage of a location receiver is a time signal is typically available. By knowing time and location, the sunset for a location on the earth may be calculated or looked up (depending upon implementation) and that data used to turn on and off the far-red light bulb. Similarly, a photoelectric (light) sensor 406 may be monitored to determine when light has been reduced a sufficient amount to appear as dusk (such as cloudy days) and activate the RLD 402 prior to sunset, because of reduced visibility conditions (clouds, smog, fog, etc. . . . ). It is understood, that a system may be employed that only relies on the photoelectric (light) sensor 406 for determining when to turn on the far-red light bulb for a predetermined amount of time.

Figure 5:
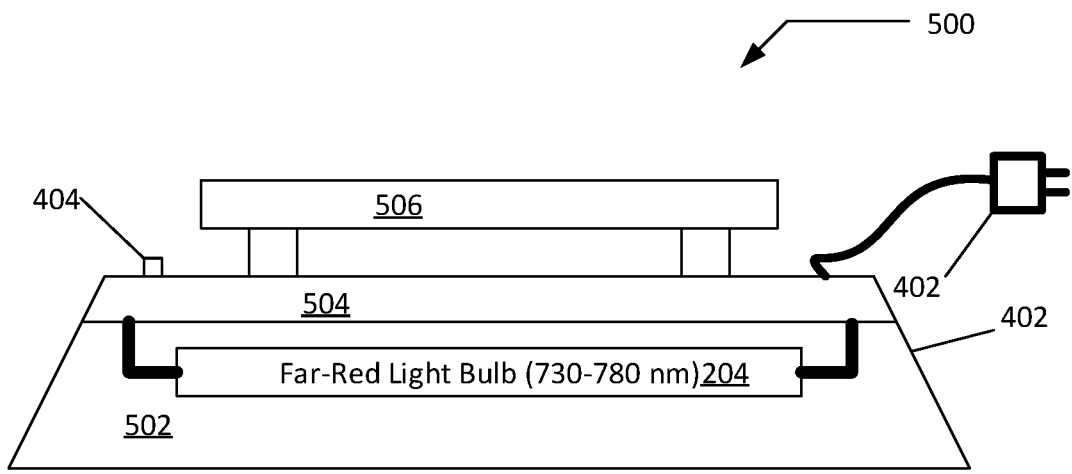
FIG. 5 is an illustration of the RLD of FIG. 4 in accordance with an example implementation of the invention.
Figure 5:
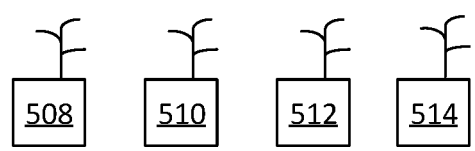

In FIG. 5, an illustration 500 of the RLD 402 of FIG. 4 is depicted in accordance with an example implementation of the invention. The RLD 402 has a reflector 502 to reflect the light from the far-red light bulb 204. The electronics of FIG. 4 are encased in area 504 above the far-red light bulb 204 and typically will have a cord that terminates in a plug 402 for connection to power. In other implementations, power may be supplied by batteries or solar cells. A positioning receiver (GPS receiver) 404 may be partially exposed (i.e. antenna) outside of the RLD 500. A handle or mounting attachment/area 506 is accessible to support the RLD 500 in order to shine the far-red light onto the short-day plants 508-514.

Figure 6:
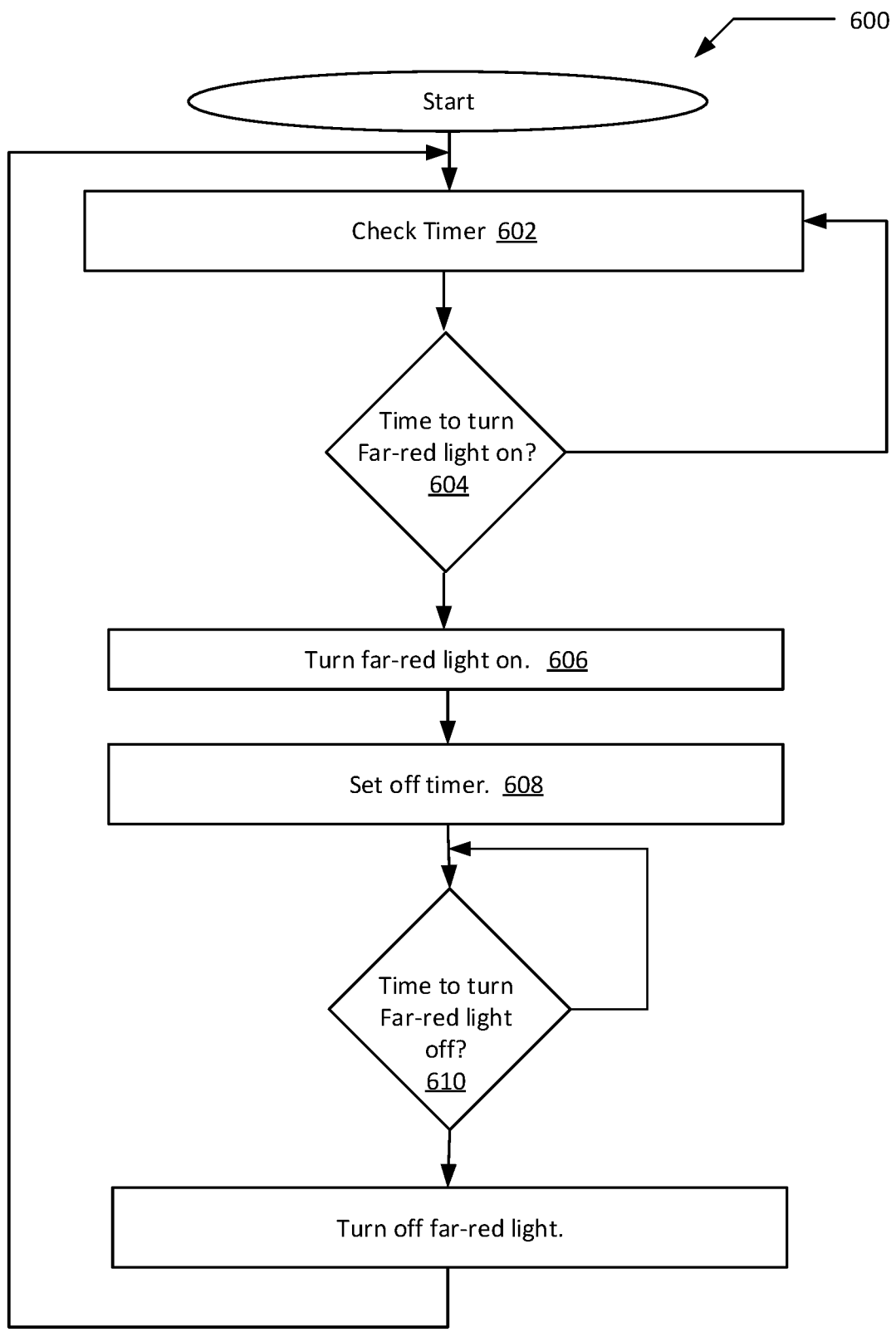
FIG. 6 is a flow diagram of the operation of the RLD of FIG. 3 that accelerates the conversion of inactive Pfr to active Pr as depicted in FIG. 1, controlled by a processor in accordance with an example implementation of the invention.

Turning to FIG. 6, a flow diagram 600 of the operation of the RLD 302 of FIG. 3 that accelerates the conversion of inactive Pfr 104 to active Pr 102 as depicted in FIG. 1 controlled by a processor 304 in accordance with an example implementation of the invention. The RLD 302 is switched on with switch 210. The timer implemented in processor 304 is checked 602 to determine if it is set and if so, has the time been reached or count achieved (approach for implementing a timer may vary depending upon processor and implementer). If it is time to turn on the far-red light 604 the far-red light is turned on 606 and an off timer is set 608 by the processor for a predetermined amount of time. Otherwise, the time is checked again 602 by the processor. The off timer is checked to determine if the far-red light will be turned off 610. If the timer has not expired, then it is checked again, otherwise, the far-red light is turned off 612 and the timer is checked to determine if it is time to turn the far-red light back on 602.

It will be understood and is appreciated by persons skilled in the art, that one or more processes, sub-processes, or process steps described in connection with FIG. 6 may be performed by hardware and/or software (machine-readable instructions). If the approach is performed by software, the software may reside in software memory in a suitable electronic processing component or system such as one or more of the functional components or modules schematically depicted in the figures.

The software in software memory accessed by a processor (internal or external to the processor) may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, or semiconductor system, apparatus or device. More specific examples, but nonetheless a non-exhaustive list, of tangible computer-readable media, would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in computer memory.

The foregoing detailed description of one or more embodiments of the approach for promoting rapid conversion of inactive Pfr 104 to active Pr 102 has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A plant lighting device, comprising:
   a far-red light having a wavelength from 730 nm to 780 nm and includes a moonlight light portion, that promotes conversion of inactive Pfr to active Pr; and
   a timer coupled to the far-red light for turning the far-red light on for a predetermined period prior to a dark period and turning the far-red light off after the predetermined period.

2. The plant lighting device of claim 1, includes a processor that implements the timer.
3. The plant lighting device of claim 2, where the processor accesses a data set of sunset times used to set the timer.
4. The plant lighting device of claim 2, includes a light sensor to determine when to turn the far-red light on prior to darkness and set the timer for a predetermined duration of far-red light.
5. The plant lighting device of claim 2, includes a location receiver to determine a location for use in identification of a dark period.
6. The plant lighting device of claim 5 where the dark period is sunset.
7. The plant lighting device of claim 1, where the plant lighting device includes a handle.
8. The plant lighting device of claim 1, where the far-red light is a light-emitting diode (LED).
9. The plant lighting device of claim 1, where the moonlight portion is 10 percent of the far-red light.
10. The plant lighting device of claim 1, includes a drone that carries the far-red light.
11. The plant lighting device of claim 1, includes a robot that carries the far-red light.
12. A method of promoting conversion of inactive Pfr to active Pr in short-day plants, comprising:
    setting a timer coupled to a far-red light device; and
    activating prior to a dark period a far-red light having a wavelength from 730 nm to 780 nm and includes a moonlight light portion, that is controlled by the far-red light device in response to the timer for a predetermined time.
13. The method of claim 12, includes determining the dark period approaches with a light sensor, and signaling for activation of the far-red light.
14. The method of claim 13, wherein setting the timer is in response to the light sensor.
15. The method of claim 12, includes determining a location of the far-red light device with a location receiver; and
    identifying sunset based upon the location of the far-red light device.
16. The method of claim 12, detecting the dark period is identifying sunset.
17. The method of claim 12, where the far-red light is a light-emitting diode.
18. The method of claim 12, where the moonlight portion is ten percent of the far-red light.
19. The method of claim 12, where a drone carries the far-red light.
20. The method of claim 12, were a robot carries the far-red light.

* * * * *